(12) United States Patent
Rana et al.

(10) Patent No.: US 11,941,500 B2
(45) Date of Patent: Mar. 26, 2024

(54) SYSTEM FOR ENGAGEMENT OF HUMAN AGENTS FOR DECISION-MAKING IN A DYNAMICALLY CHANGING ENVIRONMENT

(71) Applicant: Agile Systems, LLC, Rochester, MI (US)

(72) Inventors: Satyendra Pal Rana, Austin, TX (US); Ekrem Alper Murat, Shelby Township, MI (US); Ratna Babu Chinnam, Rochester, MI (US)

(73) Assignee: AGILE SYSTEMS, LLC, Rochester, MI (US)

( * ) Notice: Subject to any disclaimer, the term of this patent is extended or adjusted under 35 U.S.C. 154(b) by 0 days.

(21) Appl. No.: 18/068,636

(22) Filed: Dec. 20, 2022

(65) Prior Publication Data

US 2023/0186162 A1 Jun. 15, 2023

Related U.S. Application Data

(63) Continuation-in-part of application No. 17/643,635, filed on Dec. 10, 2021, now Pat. No. 11,531,501.

(51) Int. Cl.
*G06N 20/00* (2019.01)

(52) U.S. Cl.
CPC .................... *G06N 20/00* (2019.01)

(58) Field of Classification Search
None
See application file for complete search history.

(56) References Cited

U.S. PATENT DOCUMENTS

| 8,442,932 | B2 | 5/2013 | Zangwill |
| 8,868,471 | B1 | 10/2014 | Hullender |
| 8,930,247 | B1 | 1/2015 | Zhang et al. |
| 2012/0005131 | A1 | 1/2012 | Horvitz et al. |
| 2017/0223190 | A1* | 8/2017 | Mandel ............... G06Q 30/016 |
| 2017/0242860 | A1* | 8/2017 | Souche .............. G06F 16/2455 |
| 2020/0356865 | A1 | 11/2020 | D'Auria |
| 2022/0103684 | A1* | 3/2022 | Chavez ................ H04M 3/493 |
| 2022/0240058 | A1* | 7/2022 | Conner ................ H04L 51/214 |

FOREIGN PATENT DOCUMENTS

| CA | 2983864 A1 | 5/2017 |
| WO | 2004021147 A2 | 3/2004 |
| WO | 2021137897 A1 | 7/2021 |

* cited by examiner

*Primary Examiner* — David R Vincent
(74) *Attorney, Agent, or Firm* — FisherBroyles, LLP; Susan M. Oiler (57) ABSTRACT

Disclosed is a system and a method for engagement of human agents for decision-making in a dynamically changing environment. An information request related to a problem requiring a decision is received. Further, problem data comprising metadata associated to the problem, and decision-making data is received. Then, an information type is determined for the information request. Subsequently a set of human agents from a list of one or more human agents is determined using an engagement model. Further, a request elicitation type is determined for the set of human agents using an elicitation model. Further, an input is received from the set of human agents. Further, the input is used to retrain the engagement model and the elicitation model. Finally, the decision-making data is continuously enhanced based on the input received, the request elicitation type, and the information type.

27 Claims, 5 Drawing Sheets

SYSTEM FOR ENGAGEMENT OF HUMAN AGENTS FOR DECISION-MAKING IN A DYNAMICALLY CHANGING ENVIRONMENT

PRIORITY INFORMATION

The present application is a continuation-in-part of prior U.S. application Ser. No. 17/643,635, filed Dec. 10, 2021.

TECHNICAL FIELD

The present subject matter described herein, in general, relates to a system and a method for utilizing automation in decision making, and more particularly to utilization of automation in man-machine collaborative decision making in a dynamically changing environment.

BACKGROUND

Decision making is a complex process that involves analysis of the data. Making an informed decision has been simplified with increased digitization and improvement in computer technology. The internet has played an important role in making the data readily available for everyone to use. Machines can now execute jobs that were previously only possible for humans, such as making decisions, thanks to technological advancements and the introduction of artificial intelligence and deep learning. The decision making is relevant to any field of human endeavour some examples may be resource management, service management, government, commercial industry, asset management, security management, and a host of other fields that require decision making. There are various systems available for assisting humans in decision making as processing data from a repository is not a difficult task for a machine. The various systems available today have one common problem. The world is dynamic, and most of the processes we come across in our daily lives are non-linear and depend on dynamic, interdependent parameters, which makes it difficult for the various systems to comprehend real-life situations and arrive at a conclusion.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for engagement of human agents for decision-making in dynamically changing environments. This summary is not intended to identify essential features of the claimed subject matter nor is it intended for use in determining or limiting the scope of the claimed subject matter.

In one implementation, a system for engagement of human agents for decision-making in dynamically changing environments. The system may receive an information request relating to a problem requiring a decision. Further, problem data corresponding to the problem may be received. It may be noted that the problem data may comprise metadata associated to the problem, and decision-making data. The metadata associated to the problem may comprise at least a goal, constraints, success measures, a list of the one or more human agents involved in a decision-making process, and historic data comprising information received from the one or more human agents, a success ratio of the information received from the one or more human agents. The decision-making data may comprise at least one or more intermediate steps, importance of the one or more intermediate steps, a decision-making flow, and historic data comprising past information requests received. Further, the system may determine an information type based on the problem data. The information type may be at least a fact, an opinion, and a judgement. It may be noted that the system may use an acquisition model to determine the information type.

Further, the system may determine a set of human agents, for the information request, from the list of one or more human agents based on the problem data. The set of human agents may be determined using an engagement model. It may be noted that the set of human agents may comprise one or more subsets of human agents for each intermediate step of the one or more intermediate steps from the decision-making data. Subsequently, the system may determine a Request Elicitation Type (RET) for the set of human agents based on the problem data and the determined information type. The RET may be determined using an elicitation model. It may be noted that the RET may correspond to how the information request is framed for a particular human agent. The system may then receive an input from the set of human agents for the information request based on the information type, and the RET. The input may be at least a text response, a visual response, an audio response, a video response, and a feedback. It may be noted that the system may use the input received to retrain the engagement model using recursive learning techniques. Finally, the decision-making data may be continuously enhanced based on the input received, the determined request elicitation type, and the determined information type.

In yet another implementation, non-transitory computer readable medium embodying a program executable in a computing device for engagement of human agents for decision-making in dynamically changing environments is disclosed. The program may comprise a program code for receiving an information request relating to a problem requiring a decision. Further, the program may comprise a program code for receiving problem data comprising metadata associated to the problem, and decision-making data. Further, the program may comprise a program code for determining an information type based on the problem data. The information type may be determined using an acquisition model. It may be noted that the information type may be at least a fact, an opinion, and a judgement. Subsequently, the program may comprise a program code for determining a set of human agents from a list of one or more human agents for the information request based on the problem data. The set of human agents may be determined by using an engagement model. Further, the program may comprise a program code for determining a Request Elicitation Type (RET) for the set of human agents based on the problem data and the information type using an elicitation model. The RET may correspond to how the information request is framed for a particular human agent. Further, the program may comprise a program code for receiving an input from the set of human agents for the information request based on the information type, and the request elicitation type. Furthermore, the program may comprise a program code retraining the engagement model based on the received input using recursive learning techniques. Finally, the program may comprise a program code for continuously enhancing the decision-making data based on the input received, the determined request elicitation type, and the determined information type.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for engagement of human agents in decision making in a dynamically changing environment disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "extracting," "determining," "retraining," "enhancing," "modifying," "calculating," "generating," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a system and a method for engagement of human agents for decision-making in a dynamically changing environment. It may be noted that the present subject matter mainly focuses on complex decision scenarios with high stakes. The complex decision scenarios require a great deal of deliberation because of the risk and reward associated with consequences of decision-implementing action. The complexity of the act of decision-making emanates from various dimensions of the decision-making problem, such as:

The sheer number of factors to be considered in the decision;

Multiple and conflicting goals;

Multiple human agents, each pushing their own perspectives;

Long duration of decision-making and decision implementing actions, during which many factors can change;

Ambiguity and uncertainty of available information;

Human factors—such as differing viewpoints, levels of skills and experience of decision contributors, emotions, and the effects of political and other social relationships; and High risk of not obtaining the desired outcome, and of unintended consequences.

The system and the method disclose strategically and systematically involving concerned human agents for decision making in a high risk, dynamically changing environment. Initially, an information request relating to a problem requiring a decision may be received. Further, problem data comprising metadata associated to the problem, and decision-making data may be received. Subsequently, an information type may be determined based on the problem data. The information type may be determined using an acquisition model. Then, a set of human agents from a list of one or more human agents may be determined based on the problem data using an engagement model. It may be noted that the set of human agents may be selected based on a participation value, an information value, and a human involvement cost. Further, a Request Elicitation Type (RET) for the set of human agents may be determined based on the problem data, and the information type using an elicitation model. Based on the RET, and the information type, information may be received from the set of human agents. The information received may be further used to retrain the engagement model and the elicitation model using recursive learning techniques. Finally, the decision-making data may be continuously enhanced based on the information received, the determined request elicitation type, and the determined information type.

Certain technical challenges exist in engagement of human agents for decision making in a dynamically changing environment. One technical challenge faced while determining an information type is that an information request may not have a specific requirement or a mention of the type of information required to satisfy the information request. It may be confusing to answer an information request without knowledge of what is exactly required. The solution presented in the embodiments disclosed herein to address the above challenge is machine learning based acquisition model trained to analyse the problem data, and the decision-making data and determine what type of information may be required for a particular information request.

Another technical challenge faced may be determining number of human agents and which human agents from a list of one or more human agents may be required for a particular information request. The involvement of correct human agents and sufficient number of human agents may be crucial for efficient decision-making. The solution presented in the embodiments disclosed herein to address the above challenge is machine learning based engagement model. The engagement model is trained to analyse data comprising roles and seniority of the one or more human agents, historic data about input provided for one or more past information requests, and success ratio of the input provided to calculate an information value, participation value, and a human involvement cost. Further, the engagement model is continuously trained to determine a set of human agents from the list of one or more human agents based on the information value, the participation value, and the human involvement cost of each human agent from the list of one or more human agents. It may be noted that the engagement model is trained using historic data and the historic data is continuously modified by addition of inputs provided by the one or more human agents for each information request. The inputs provided by the one or more human agents may comprise a feedback regarding the output of the engagement model. The feedback is then used to retrain the engagement model after modifying the training data based on the feedback.

Figure 1:
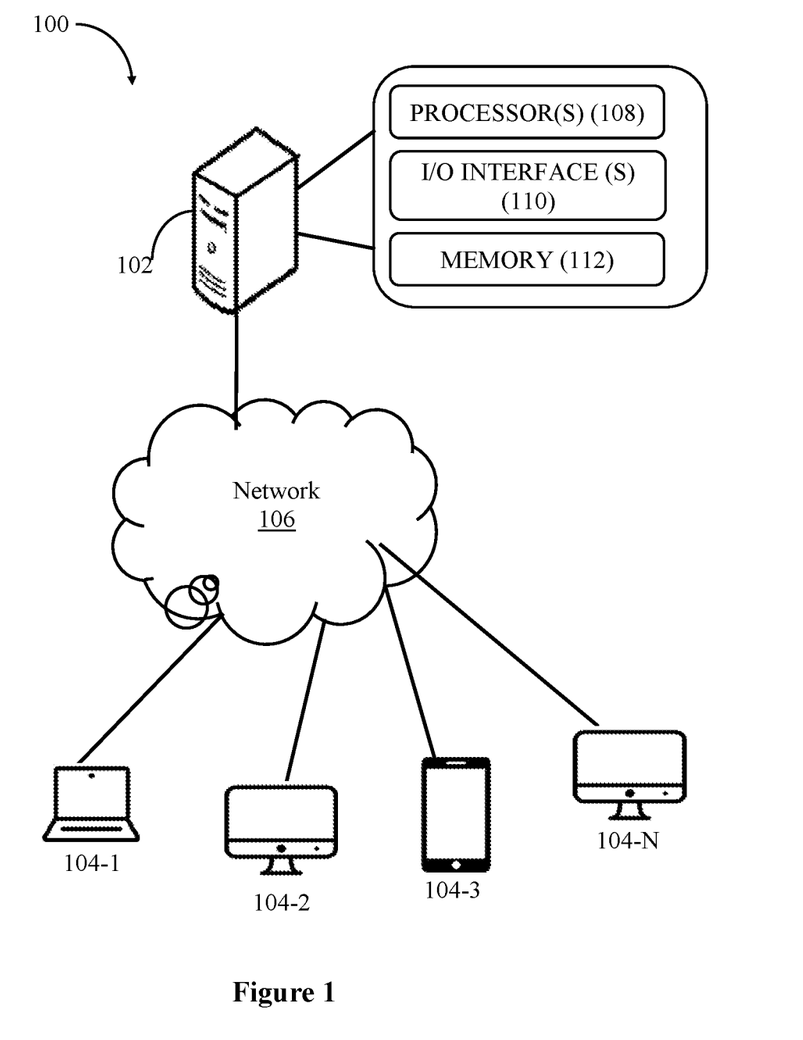
FIG. 1 illustrates a network implementation of a system for engagement of human agents for decision-making in a dynamically changing environment, in accordance with an embodiment of the present subject matter.

Referring now to FIG. 1, a network implementation 100 of a system 102 for engagement of human agents for decision-making in a dynamically changing environment is disclosed. Initially, the system 102 receives an information request, relating to a problem. It may be noted that a decision may be required for the problem. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. Further, the system 102 may also receive feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for engagement of human agents for decision-making in a dynamically changing environment. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for engagement of human agents for decision making in a dynamically changing environment. The system may also be referred to as a Collaborative Decision-making System (CDS). Initially, the system may receive a query from a user.

It may be noted that the query corresponds to a problem requiring a decision. In an embodiment, the query may be "Expand business into a new territory," or "Buy a house," or "Find a cure for COVID," or "Make a career move" or alike.

Further to receiving the query, the system 102 may calculate one or more intermediate steps required to reach a decision based on metadata associated to the problem. It may be noted that the one or more intermediate steps are calculated using reinforcement learning, deep learning algorithms and artificial intelligence techniques. In an embodiment, the one or more intermediate steps may also be calculated using combination of the reinforcement learning, deep learning algorithms, mathematical modelling, and artificial intelligence techniques. The metadata may comprise a goal, constraints, success measures, a list of the one or more human agents involved in a collaborative decision making. The list of the one or more human agents may define the roles and seniority of each of the one or more human agents. The goal may represent the objective or final expectation of the user. The constraints may represent the limitations of resources available to achieve the goal. The success measures may represent the parameters used for confirmation of achievement of the goal.

The one or more human agents may be assigned below roles:

Decision-Maker—A person having an authority to make a decision. The authority may be essential to allocate resources to implement the decision. There may be multiple decision-makers involved in a decision program.

Stakeholder—A person affected by a decision. There may be multiple stakeholders in a decision program bringing in diverse perspectives.

Expert—A person having knowledge relevant to the generation of a decision space. The expert may assess the characteristics of a decision point in the space.

Decision Program Manager—An individual responsible for decision program life-cycle operations.

Decision Intelligence Manager—An individual responsible for configuring and setting up the system.

System Administrator—An individual responsible for the operational management of the system.

Subsequent to calculating the one or more intermediate steps, the system 102 may establish a decision-making flow for the one or more intermediate steps required to reach the decision. The decision-making flow may correspond to a sequence for execution of the one or more intermediate steps. The sequence may be determined based on an importance and a severity of the one or more intermediate steps using reinforcement learning and artificial intelligence techniques. The importance and the severity of the one or more intermediate steps may be determined based on impact of each intermediate step on the decision. The impact of each intermediate step may be calculated using predictive algorithms. In an embodiment, a decision of an intermediate step may be referred as an intermediate decision.

In an embodiment, let us assume that one or more intermediate steps are A, B, C, D, and E. Further, the system may determine a sequence for execution of the one or more intermediate steps. Let us assume that the order may be "C, B, D A, and E." It may be noted that the order may be determined based on an importance and a severity of the one or more intermediate steps.

Further to establishing the decision-making flow, the system 102 may generate a decision space comprising one or more decision options. The one or more decision options may be calculated based on the decision-making flow using artificial intelligence and reinforcement learning techniques.

In an embodiment, the decision space may be empty initially. It may be noted that the decision space may represent a criteria to limit the one or more decision options. The decision space may be modified by changing the criteria during the decision-making flow. The decision space may be modified at least by the one or more human agents or when an uncertain event occurs. The decision space may be filled dynamically, during the decision-making flow, with the decision options that fit the criteria.

A decision option may represent a possible choice for decision content of a decision in a decision implementing intention. It may be noted that the decision-space may be a set whose members are decision options. The members may be added or removed from the set during the act of decision-making as new information is obtained. A snapshot of the decision space at a point in time contains all members under consideration at that time. A decision space model may be a compact representation of the decision space when it is impractical to explicitly list all members in the space. When needed, members of the decision space can be generated by executing a generation procedure associated with the decision-space model.

Further to generating the decision space, the system 102 may modify the decision space based on one or more uncertain events. The modification may indicate addition of one or more new decision options or removal of one or more decision options. The one or more new decision options may be calculated based on the new information or uncertain events. Similarly, the removal of the one or more decision options may be based on the new information or uncertain events. The one or more uncertain events may create an uncertain impact on the decision-making flow. The uncertain impact may be calculated using predictive algorithms and artificial intelligence techniques. In an embodiment, the one or more uncertain events may be eliminated when the uncertain impact is less than a predefined threshold.

It may be noted that the one or more uncertain events may lead to a risk having consequences. The one or more risk may be calculated using Artificial Intelligence Techniques. The consequences may be predicted and calculated using predictive algorithms and artificial intelligence techniques. Consider an example, a company wants to hire employees (a problem). The one or more risk associated with the problem may be at least the company received zero applications, zero applicants qualified for the interview, an applicant rejected an offer letter, incompetent candidate got hired, applicant quits after being hired, and alike. It may be noted that the system calculates the consequence for each risk. In an embodiment, the system may suggest preventive measures or risk informed strategy to reduce the impact of the consequences. The risk may be low, medium, or high based on the impact of the consequences. In another embodiment, the impact of the consequences may be a short term, medium term, or a long term. In yet another embodiment, the system assists the one or more human agents to select an intermediate decision to avoid risk.

The one or more uncertain events may be determined based on new information. The system may receive new information from external data sources and the input from the one or more human agents at the one or more intermediate step based on the importance and the severity of the step. The external data source may comprise internet search, monitoring changes in published data repositories, subscription to market research services, and analysis of news and social media content. In an embodiment, the input from the one or more human agents may be a judgement, an additional decision option, or alike. The new information may be used to calculate the one or more uncertain events or execute consequent intermediate steps in the decision-making flow. In an embodiment, the system 102 may nudge a human agent from the one or more human agents for the input based on a predefined matrix of roles and seniority of the human agent.

In an embodiment, the system may comprise an engagement engine to receive the input for the new information. The engagement engine may also be referred to as the system for engagement of human agents with a collaborative decision-making system or the system for engagement of human agents for decision-making in a dynamically changing environment.

The engagement engine may be configured to execute a set of instructions for engagement of human agents with a collaborative decision-making system. In an embodiment, the engagement engine may receive an information request relating to a problem that may require decision-making. The information request may be received from the collaborative decision-making system used by a user to reach a decision regarding the problem. The information request may be received when the Collaborative Decision-making System (CDS) may need at least an approval, new information, and a feedback from a human agent to proceed with a decision-making process.

Further to receiving the information request, the engagement engine may receive problem data. In an embodiment, the engagement engine may receive the problem data from the CDS. The engagement engine may access a database of the CDS to extract the problem data that may be stored in the memory or on a server. The problem data may comprise metadata associated to the problem, and decision-making data. The metadata may comprise the goal, constraints, success measures, the list of the one or more human agents involved in a decision-making process, and historic data comprising input received from the one or more human agents for past information requests, and a success ratio of the input received from the one or more human agents. The list of the one or more human agents may include responsibilities and seniority of each of the one or more human agents. Further, the decision-making data may comprise the one or more intermediate steps, importance of the one or more intermediate steps, the decision-making flow, and historic data comprising past information requests. The one or more intermediate steps may be a part of the decision-making process of the collaborative decision-making system for the problem.

In an embodiment, sending an information request to the engagement engine may be an intermediate step of the decision-making process of the CDS. The decision-making flow may define a sequence of the one or more intermediate steps. The historic data may comprise past information requests, one or more human agents or a set of human agents involved for the past information requests, and the input received from the involved set of human agents.

Further to receiving the problem data, the engagement engine may determine an information type for the information request based on the problem data. The information type may be at least a fact, an opinion, and a judgement. The engagement engine may use an acquisition model to determine the information type. The acquisition model is a machine learning based model which is dynamically trained using a training data comprising a plurality of information requests, corresponding problem data for the plurality of information requests, and corresponding information types for each of the plurality of information requests. The acquisition model may be trained to produce an information type as an output for an input of an information request and corresponding problem data of the information request. In an embodiment, the engagement engine may configure NLP (Natural Language Processing) algorithms and NLU (Natural Language Understanding) algorithms to synthesize the information request.

Consider an example, let us assume that the information request is "Validate adjusted budget for activity A." The acquisition model may determine that the information type for the information request based on one or more keywords in the information request using Natural Language Processing (NLP) algorithms, Natural Language Understanding (NLU) algorithms. The acquisition model may match the one or more keywords present in the information request to keywords from the training data and determine the information type corresponding to an information request in the training data having the matching one or more keywords. In the above example, let us assume that the keyword is "Validate." Let us assume that the training data may have an information request—"Validate the list of participants." and the corresponding information type—"Judgement." The acquisition model may determine that the information type for the information request in the example is "Judgement."

After determining the information type, the engagement engine may determine a set of human agents for the information request based on the problem data. The set of human agents may be determined using an engagement model. The engagement model is machine learning based model which is trained using a training data comprising a plurality of information requests, a plurality of lists of one or more human agents corresponding to the plurality of information requests, problem data corresponding to each of the plurality of information requests, a plurality of sets of human agents for each information request from the plurality of information requests. It may be noted that the plurality of lists of one or more human agents includes responsibilities and seniority of each human agent from the list of the one or more human agents. Further, the problem data may include the intermediate step corresponding to the information request from the decision-making process and the importance of the intermediate step. In an embodiment, the set of human agents for the information request may comprise one or more subsets of human agents for one or more intermediate steps associated with the information request.

In an embodiment, the engagement model may be trained to calculate an information value, a participation value, and a human involvement cost for each human agent from the list of one or more human agents associated to the information request. The information value may correspond to a merit of the input provided by a human agent via the user device. The merit may depend on correctness, relevance, and details. The participation value may correspond to importance of involvement of a human agent for an information request. The cost of human involvement may be proportional to at least a time of response to an information request, availability, and seniority of a human agent.

The information value may be calculated based on the historic data comprising past information requests where the human agent was involved, the input provided by the human agent for the past information requests, information used by the collaborative decision-making system for the decision-making process associated with the information request.

Consider an example, let us assume that a "Human Agent A" was involved in 8 past information requests. Input provided by "Human Agent A" was used for 2 past information requests received from the collaborative decision-making system. The information value for "Human Agent A" may be calculated as ⅖.

Further, the participation value may be calculated based on the intermediate step associated with the information request, the importance of the intermediate step, responsibilities, and seniority of the one or more human agents, and historic data comprising feedback provided for past information requests associated to a problem. The feedback may be negative or positive with respect to the set of human agents determined for the past information requests.

Consider an example, let us assume that the list of one or more human agents comprises of a "Human agent B" and a "Human Agent C." Let us assume that the "Human Agent B" is CEO of an organization B, and the "Human Agent C" is an intern at the organization B. The information request is "Approve the final decision of terminating one or more employees of organization B." Let us assume that the "Human Agent B" has provided feedback for 70 past information requests similar to the information request in the example. Let us assume that the feedback was negative when the "Human Agent B" was not in the set of human agents for one or more past information requests of the 70 past information requests, and vice-versa. Let us assume that "Human Agent C" has provided 0 feedbacks. The participation value of the "Human Agent B" will be higher than the participation value of "Human Agent C."

The cost of human involvement may be calculated based on historic data comprising time of response for past information requests, seniority, and availability of the human agent. Consider an example, let us assume that the list of one or more human agents comprises a "Human Agent D," and a "Human Agent E." The "Human Agent D" has been involved in 4 past information requests, and the "Human Agent E" has been involved in 5 past information requests. Let us assume that the "Human Agent D" is a manager that works for 3 hours a day, and "Human Agent E" is a manager that works for 8 hours a day. Let us assume that time of response of the "Human Agent D" for the past information requests is 12 hours, 16 hours, 20 hours, and 14 hours. Let us assume that the time of response of the "Human Agent E" for the 5 past information requests is 1 hour, 2 hours, 30 minutes, 1 hour, and 1 hour. The cost of human involvement for "Human Agent D" will be higher than the cost of human involvement of "Human Agent E." Considering the same example, if the "Human Agent E" is on a leave for 5 days and the "Human Agent D" is working at the time of receiving a new information request, the cost of human involvement for the "Human Agent D" will be lower than the cost of human involvement for the "Human Agent E".

In an embodiment the information value, participation value, and the cost of human involvement may be a value in the range of 1-10. The information value, the participation value, and the cost of human involvement may be calculated using a training data comprising a plurality of information requests, a plurality of lists of one or more human agents corresponding to the plurality of information requests, corresponding problem data for the plurality of human requests, information value for each human agent of the plurality of lists of one or more human agents, participation value for each human agent of the plurality of lists of one or more human agents, and the cost of human involvement for each human agent of the plurality of lists of one or more human agents.

In an embodiment, the engagement model may calculate a confidence score for each human agent based on the information value, the participation value, and the cost of human involvement of the human agent. The confidence score may be a value in a range of 1-10. Further, the engagement model may determine whether the human agent may be in the set of human agents for an information request based on a threshold confidence score. The threshold confidence score may be predefined for the information request. It may be noted that the confidence score of the human agent may be updated continuously after providing an input.

In an embodiment, the engagement model may determine the set of human agents from the list of one or more human agents for an information request based on the information value, the participation value, and the cost of human involvement. In an embodiment, the information request may have a predefined threshold of the information value, the participation value, and the cost of human involvement. The set of human agents may comprise one or more human agents having the information value greater than the predefined threshold of information value, the participation value greater than the predefined threshold of participation value, and the cost of human involvement less than the predefined threshold. It may be noted that the engagement model is continuously trained using recursive learning. The engagement model is trained using historic data that is continuously updated and modified based on the input received from the set of human agents in real-time.

In an embodiment, the engagement model may extract the historic data of the human agents from the one or more user devices 104. The human agents may create an account on their respective user devices to enlist themselves as a part of the list of one or more human agents. Each iteration of receiving an information request and providing an input for the information request may be generate and expand the historic data on the user device or a server connecting the user device to the system.

Further to determining the set of human agents, the engagement engine may determine a Request Elicitation Type (RET) for the set of humans based on the information type, and the problem data. The engagement engine may use an elicitation model to determine the RET. It may be noted that the RET may be different for each human agent from the set of human agents, the RET may be different for a human agent for different information requests. The RET may correspond to how an information request may be framed for a human agent. In other words, the RET may correspond to a method used to communicate the information request to the human agent. RET may be at least one of a comparison type, an option type, an audio type, a video type, a brief answer question type, a long answer question type, and the like.

In an embodiment, the engagement engine may generate a human agent profile for the human agent based on the historic data comprising past information requests answered by the human agent, the input provided for the past information requests, the RET of the past information requests, responsibilities, and seniority of the human agent. Further, the engagement engine may generate RET profiles for each RET using external data sources such as internet, research papers, surveys, and the like. The RET profiles may indicate suitability of the RET for different human agent profiles, different information requests, different information types, different problems associated with the information requests.

The elicitation model may use a machine learning algorithm trained using training data comprising a plurality of information requests, corresponding problem data for the plurality of information requests, corresponding sets of human agents for the plurality of information requests, human agent profiles of each human agent from the sets of human agents, RET profiles, RET for each human agent for the corresponding information requests. The elicitation model may be trained to produce an RET for each human agent in a set of human agents for an information request as an output for an input of the information request, the set of human agents, the problem data. The elicitation model may compare the human profile of a human agent in the set of human agents with the human agent profiles of human agents in the training data and select the RET of the human agent in the training data having a similar human profile to the human agent in the set of human agents for the information request.

In an embodiment, the elicitation model may match human agent profiles of each human agent from the set of human agents with the RET profiles to determine the most compatible RET for each human agent.

Further to determining the RET for each human agent of the set of human agents, the engagement engine may receive input required for the information request from the set of human agents. It may be noted that the input required for the information request may be different for each human agent from the set of human agents. The engagement engine may display the information request to the set of human agents based on the RET and the information types. The human agents may use a user device to provide the input using a graphical user interface. The input may be an audio response, a video response, a test response, a selection, a graphical response, and a feedback. The feedback may correspond to relevance of the information request for the human agent. The feedback may correspond to at least relevance of the information request for the human agent, relevance of the RET for the human agent, correctness of the information type for the information request, appropriateness of the human agents in the set of human agents. The feedback may either be positive or negative. In an embodiment, failure to receive the input from a human agent may be considered as negative feedback.

Upon receiving the input from the set of human agents, the engagement engine may retrain the engagement model and the elicitation model based on the received information. The engagement engine may verify the use of the received information with the CDS. In case the input is not used by the CDS, the training data for the engagement model and the elicitation model may be changed for similar types of information requests such that during the next iteration of a similar information request, the set of human agents, the RET and the information type do not match the set of human agents, the RET and the information type used for receiving the input that was not used by the CDS. In an embodiment, upon receiving negative feedback from a human agent with respect to the RET for an information request, the engagement engine may modify the training data for the elicitation model to avoid negative feedback in future iterations.

Finally, the engagement engine may use the input received from the set of human agents to continuously enhance the decision-making data. The enhancement of the decision-making data may improve the efficiency and accuracy of the system for engagement of human agents with a collaborative decision-making system. Each iteration of the engagement engine may add new data to the historic data of information requests.

Consider an example, a minister of foreign relations of Country A is using a collaborative decision-making system. The minister needs a decision for a problem, let us assume that the problem is "Improving relations with Country B." In case of such problems, the collaborative decision-making system may seek at least new information, and approval, from one or more human agents, for one or more intermediate steps in the decision-making process of the CDS using the engagement engine. Let us assume that the CDS seeks an approval on a list of ministers from the Country B being invited to a gathering. The information request in case of the example is "Approval for List of Ministers of Country B invited to a gathering." The foreign relations department of a government is a large body with many members. The system may extract the problem data comprising the list of members of the foreign relations department of Country A and Country B. The list may also include the responsibilities and seniority of the members. Further, the system may select the information type as "Judgement" since the information request requires an approval. The information request may also need involvement of one or more human agents from the foreign relations department of Country B along with appropriate set of human agents from the foreign relations department of Country A. The system may select one or more ministers for the set of human agents from Country A without missing any important ministers that may object to not being involved in the process. Further, the system may select one or more ministers for the set of human agents from Country B to approve the list of ministers attending the gathering from their side. The system ensures involvement of the ministers that are necessary for the information requests based on their responsibilities, information value, participation value, and cost of human involvement. Further, the system may determine the RET for each minister part of the set of human agents based on at least the language spoken by them, the device they use, any disabilities they may have, and feedback provided for RET in any past information request. Finally, the ministers that are a part of the set of human agents may enter their selections of the list of ministers of Country B invited to the gathering.

In an embodiment, the set of human agents may have one or more subsets of human agents. Considering the above example, ministers of country A that are part of the set of human agents may be subset 1 of human agents and ministers of country B that are part of the set of human agents may be subset 2 of human agents. Further, the information request may be different for both the subsets when they are involved at different intermediate steps of the decision-making process of the CDS. Let us assume that subset 1 is involved for approving the ministers of country B selected by the CDS first in intermediate step 1 and subset 2 is involved in confirming availability of the selected ministers of country B and modifying the list in intermediate step 2. The information request for subset 1 will be "Approve the selected ministers of country B to be invited", and the information request for subset 2 will be "Check availability and modify the list of ministers".

Figure 2:
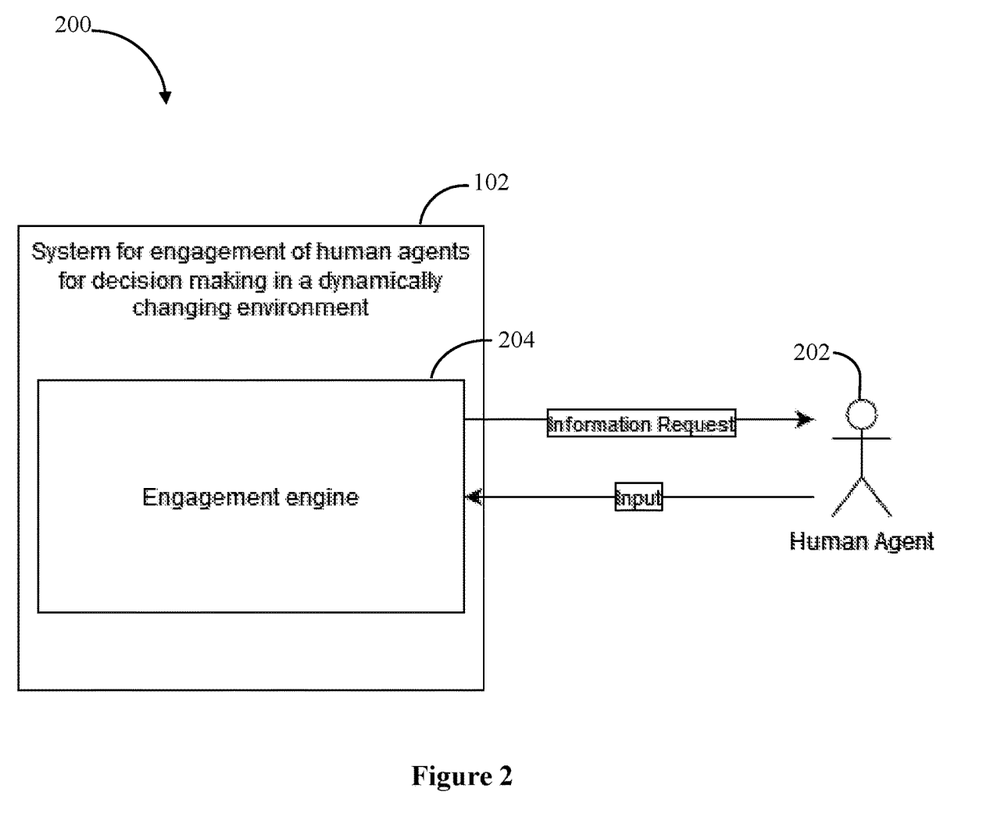
FIG. 2 illustrates an example of a communication between a human agent and a collaborative decision-making system using an engagement engine, in accordance with an embodiment of the present subject matter.

Referring now to FIG. 2, an example of a communication between the Collaborative Decision-making System (CDS) 102 and a human agent 202 using the engagement engine is illustrated. An information request generated by the CDS may be presented to the human agent 202 using the engagement engine. Further, the input received from the human agent for the information request may be received by the engagement engine. The input may be used by the CDS 102 since the engagement engine is a part of the CDS 102.

In an alternate embodiment, the engagement engine may be a stand-alone system to determine a set of human agents from the list of human agents to be involved in a decision-making process for a problem. Further the engagement engine may be used to receive input from the determined set of human agents. The input may be helpful in the decision-making process for the problem.

Further to receiving the input from the set of human agents, the system may filter the new information based on merit. The merit may be calculated by using Artificial Intelligence (AI) techniques, Mathematical Modelling, Markov Decision Modelling, and Deep Learning (DL) algorithms on factors like human bias, historic user judgements, consequences, and credibility of the external data source.

After modifying the decision space, the system 102 may generate a decision knowledge graph depicting modifications in the decision space. The decision knowledge graph may comprise data related to the modifications in the decision space. The decision knowledge graph may be a semantic knowledge graph comprising a list of new decision options added in the decision space, list of decision options removed from the decision space, a reason for the addition and the removal of the decision options from the decision space, and the intermediate step when the decision space got modified. The reason for the addition or the removal of the decision options may be caused due to an uncertain event or the new information.

It may be noted that the system uses a unique shared semantic graph, referred to as the decision knowledge graph, depicting the evolution of the decision-space during the act of decision-making. The building of the decision knowledge graph may be completed when the decision knowledge graph has enough knowledge to form a decision-implementing intention. The completed decision knowledge graph can be simply queried to retrieve information such as:

Information content of the decision; (What must guide the decision implementing action?)

The trigger information for the decision implementing information;

Explanation behind what led to commitment to the decision;

Why and when another alternative got eliminated from consideration?

The quantified value and risk associated with decision;

Under what circumstances, the decision will cease to be the preferred choice;

Further to generating the decision space, the system 102 may update the decision space and the decision knowledge graph. The decision space may be updated post validation of the decision knowledge graph by the one or more human agents. In an embodiment, the one or more human agents may provide feedback on the decision space. In another embodiment, the system may train based on the feedback provided by the one or more input. It may be noted that system continuously learns from the one or more human agents in order to improve the efficiency of the system. In an embodiment, when the one or more human agents reject the modifications in the decision space depicted in the decision knowledge graph the system may again modify the decision space. Further, the system may also reconsider the uncertain events.

Further to updating, the system 102 may select the decision based on the updated decision knowledge graph and the updated decision space. The final decision may be selected post approval of the one or more human agents. In an embodiment, the decision may be selected by a process of eliminating the one or more decision options from the decision space. It may be noted that the one or more decision options that fails to match the criteria or the goal or the constraints may be eliminated.

In an embodiment, the system 102 may reinitiate the collaborative decision making when no decision satisfies the goals, constraints and success measures or does not receive approval of the human agents. It may be noted that the decision may be selected from the updated decision space.

Consider an example, let us assume that a user is a representative of an organisation. The system may receive a query corresponding to a problem from the user. Let us assume that the problem is "hiring Data Analysts." The system may define the problem using metadata. The metadata may comprise a goal, constraints, success measures and a list of human agents. In the above example, let us assume that the goal is "hiring eight Data Analysts." Further, the constraints may be "the wage offered should not exceed $250,000," "the Data Analysts must join on 1st of January 2022," "The Data Analyst must have an Engineering degree in Computer Science," and "the Data Analysts must sign a contract of two years". Let us assume that the success measures are "the Data Analysts join on $1^{st}$ of January 2022," "the Data Analysts work until $1^{st}$ of January 2024," "eight Data Analysts must be hired," "the Data Analysts must be from an Engineering background," and "the Data Analysts must be chosen from a list of applicants." In the example, the one or more human agents involved may be a head of human resources, an associate human resources manager, a project manager, and a project leader. The system may calculate one or more intermediate steps to select eight Data Analysts out of the list of the applicants that fulfil the goals, constraints, and success measures. Further, the system may establish a decision-making flow for the one or more intermediate steps by arranging them in a sequence. Let us assume the decision-making flow for the one or more intermediate steps for the given example is 1. Receive the list of applicants from the associate human resources.
2. Ask the head of the human resources to confirm the list of the applicants and receive amendments, if any.
3. Filter the applicants from the list of the applicants and share the filtered list of the applicants with the project manager.
4. Receive amendments in the filtered list of the applicants from the project manager, if any and prepare a final list of applicants.
5. Share the final list of the applicants with the project leader for assessment.
6. Receive results of the assessment from the project leader.
7. Add new applicants to the final list of the applicants if any applicant is eliminated in the assessment process and share the new applicants with the project leader for assessment.
8. Reiterate steps 5,6 and 7 until eight Data Analysts are finalised.
9. Share the list of eight Data Analysts to hire with Associate Human Resources to validate.

A decision space comprising a plurality of decision options may be generated. The plurality of decision options may comprise the list of the applicants. The decision space may be modified at every step based on the inputs from the human agents and analysis. Considering the above example, the system may identify a risk that the list of applicants is not enough to select eight Data Analysts. The system may calculate the consequence of the risk that sufficient interns are not found out of the list of applicants. In an embodiment, the consequences may impact the growth of the organization, or efficiency of the employees, or alike. In order to reduce the impact of the consequence, the system may determine a risk informed strategy. In an embodiment, the system may provide predictive suggestion to the one or more human agents to obtain more applicants for the list of applicants. The system may nudge the associate human resources manager to obtain more applicants. The list of applicants may be modified based on the system's suggestion and the input from the associate human resources manager. The associate human resources manager may also choose to ignore the system's suggestion after reviewing the consequences and risk. Let us assume that the suggestion was ignored. The system may continuously monitor the activity of the list of the applicants on social media and check for any emails from any applicants for any new information. Consider an example, the system may identify that an applicant from the list of applicants joined a competitor firm for the period 1 Jan.-1 Jul. 2022 from a database of professional workers or social media. This may be considered as an uncertain event which may lead to removal of the applicant from the decision space. A decision knowledge graph may be generated that depicts all the modifications made in the decision space.

For the above example, let us assume that the associate human resources manager shares a list of 80 applicants. The head of human resources amends the list and removes 10 applicants. The decision knowledge graph depicts this modification and shows that the list was modified at Step 2 by the head of human resources and 10 applicants were removed from the decision space. Any other modifications made during the decision-making flow will also be recorded in a similar manner. When the system reaches a decision, the stakeholders may validate the decision knowledge graph and check all the modifications and provide feedback. The system may select a final decision. For this example, the final decision may be the list of eight Data Analysts to be hired.

Consider another example, let us assume that a user is representative of an organization. The system may receive a query corresponding to a problem the user is confronting. Let us assume that the problem is about deciding on a concept for a new product (for example, a flying car) that meets the needs of an emerging marketplace better than competing products. The system may define the problem using metadata. The metadata may comprise a goal, constraints, success measures, and a list of human agents. Let us assume that the goal is to develop an engineered product (for example, a flying car) conforming to the decided concept. The product concept is defined as a combination of capabilities (for example—seating capacity, engine type, flying height, etc.) whereas each capability has multiple options (for example, engine type may be gasoline, hybrid, plug-in hybrid, or fully electric motor).

Further the constraints may be that the product concept must be finalized within 6 months, and the concept development cost must not exceed $2 million. Let us assume that the success measures are "the concept must be feasible to manufacture," "the total per unit manufacturing cost should not exceed $15,000", "the product should have zero defects", and "the product must be ready to hit the market in 2 years after concept development".

In the example, the one or more human agents may be market researchers who represent the perceived needs of the marketplace, product manager, technology subject matter experts and chief financial officer.

Further, the system may calculate one or more intermediate steps to reach the decision that fulfil the goals, constraints, and success measures, and for selecting the best concept. Further, the system may establish a decision-making flow for the one or more intermediate steps by arranging them in an optimal sequence.

Let us assume that the decision-making flow for the one or more intermediate steps for the given example is:
1. Receive the list of requirements from market researchers.
2. Develop a list of distinct product concept capabilities to meet the requirements.
3. For each capability, identify a list of discrete capability concept variations as options for achieving that capability. This may involve ideas from technology subject-matter experts and/or searching an existing knowledge base for the product domain.
4. Assess each capability option in terms of design and manufacturing feasibility within the given constraints. This assessment may involve judgements from technology subject-matter experts, and artificial intelligence techniques to infer infeasibility.
5. Eliminate capability options which are infeasible.
6. Generate all possible product concepts by combining a feasible option from each of the identified capabilities. This may require describing product concepts by one or more decision space membership rules as explicit enumeration of all concepts may be quite complex to handle.
7. Not all concepts in step 6 may be valid because of dependencies among options of different capabilities. That is certain options may not work together in a concept whereas certain option combinations may always have to work together. Identify such dependencies by consulting subject-matter experts and leveraging prior product domain knowledge.
8. Efficiently eliminate invalid product concepts from further consideration at the right moment.
9. If the list of remaining product concepts is small or the time and budget for concept development is exhausted, go to step 14 otherwise go to step 10.
10. Select a subset of product concepts to be evaluated further. This is accomplished by using a criteria which is likely to lead to faster and cheaper convergence to the final product concept.
11. Evaluate each product concept in terms of success criteria attributes and relative preference attributes.
12. Eliminate all product concepts from further consideration which are inferior to some other remaining product concept as informed by step 11 and are likely to remain so in spite of new information in the target time frame for decision making.
13. Re-iterate steps 9-12.
14. Compare all remaining product concepts to select the most desirable product concept.

Further to establishing decision making flow, a decision space comprising a plurality of decision options may be generated. The plurality of decision options may comprise the list of all product concepts which may be explicitly recorded or described by the one or more decision space membership rules. Using the one or more decision space membership rules, one can infer whether or not an arbitrary product concept belongs to the decision space. The decision space may be modified at each step based on the inputs from the one or more human agents and analysis. Considering the above example, the system may identify a risk that the identified product concepts may not be adequate to explore newer and novel capabilities. The system may calculate the consequences of the risk to the organization. In an embodiment, the consequences may impact the competitiveness of the manufactured product conforming to the selected concept, thereby, reducing the market share of the organization.

In order to alleviate or minimize unintended consequential risk, the system may determine a risk informed strategy.

The system may engage the engagement engine to receive the input from the one or more human agents. It may be noted that the one or more human agents or a set of human agents are determined from a list of one or more human agents depending on the problem. The set of human agents are determined by using an engagement model. Further, the engagement engine may nudge the set of human agents to receive the input. The input may be received in multiple types such as facts, opinions, and judgements. The engagement engine automatically determines the information type based on the problem or the step for which a decision or input is required. In the example, the engagement engine may nudge the set of human agents to validate "the product design of the flying car." It must be noted that the system may nudge a different set of human agents at a different stage of deciding on a concept for a new product. The different stages may comprise, but not limited to, idea generation, idea screening, concept development, testing, market strategy, product development, deployment and a like. Further, the engagement engine may involve the set of human agents such as decision maker, stake-holder, expert, and alike. In the example and not by way of any limitation, the engagement engine may determine that it is not suitable to involve decision makers at the product ideation stage because the cost involved is very high. In another scenario, when the decision is complex and the stakes are high, the engagement engine may determine that the involvement of decision makers and stake holders is required.

In an embodiment, the engagement engine may provide a predictive suggestion to the one or more human agents to generate more product concepts as an information request. The system may nudge the product manager and the technology subject matter experts to consider newer capabilities in arriving at an expanded list of product concepts. The list of product concepts may be modified based on the system's suggestion and the input from technology subject matter experts (human agents). The product manager may also choose to ignore the system's suggestion after reviewing the consequences and risk. Let us assume that the suggestion was ignored. The system may continuously monitor developments in the marketplace which may influence the current perception of the risk. For example, newer experiences with flying car concepts may indicate that flying below or above a certain height has unacceptable safety risks. It may also be the case that a new regulation is passed which may impose a restriction on the flying height. This will be considered as an uncertain event which may invalidate an existing capability option and suggest one or more new capability options thereby impacting the decision space (product concept space). A decision knowledge graph may be generated that depicts all the modifications made in the decision space along with the rationale for modifications.

Further, the decision knowledge graph and the decision space may be updated post validation of one or more human agents. Finally, a decision is selected based on the updated decision knowledge graph. It may be noted that the decision is selected after consideration of all the uncertain events (e.g. restriction on the flying height). The final decision may be a flying car that meets the expectation of the user. When the user is not satisfied with the final decision the process is reiterated.

In an embodiment, the system 102 may also be referred as a decision intelligence system. It may be noted that the decision intelligence system is an adaptive and intelligent automated system that collaborates with human decision-maker (decision-making group or human agents) to help transition them from decision-making intention mental state to decision-implementing intention state.

Figure 3:
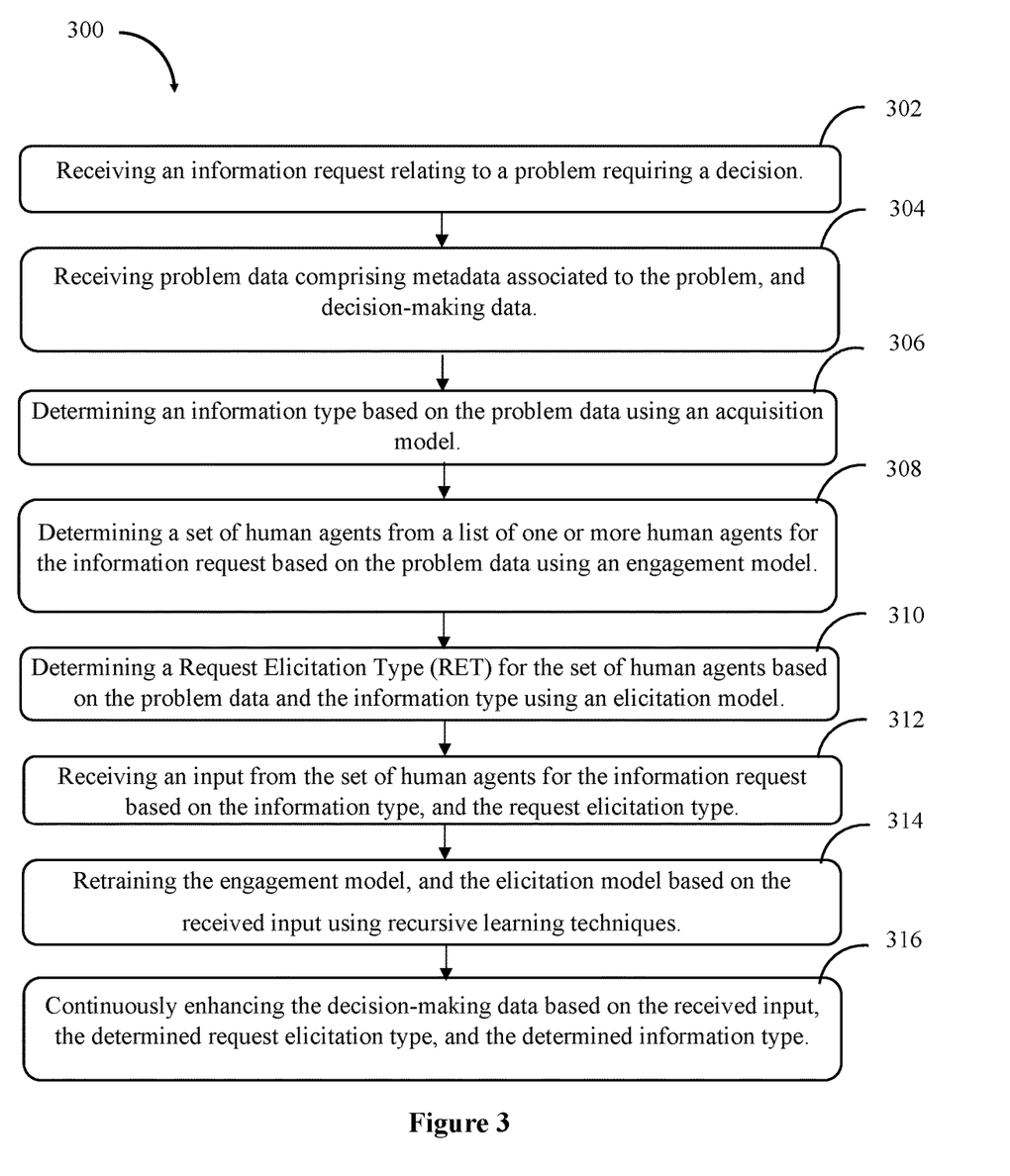
FIG. 3 illustrates a method for engagement of human agents for decision-making in a dynamically changing environment, in accordance with an embodiment of the present subject matter.

Referring now to FIG. 3, a method 300 for engagement of human agents with a collaborative decision-making system is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 is described is not intended to be construed as a limitation, and any number of the described method blocks can be combined in any order to implement the method 200 or alternate methods for engagement of human agents for decision-making in a dynamically changing environment. Additionally, individual blocks may be deleted from the method 200 without departing from the scope of the subject matter described herein. Furthermore, the method 200 for engagement of human agents for decision-making in a dynamically changing environment can be implemented in any suitable hardware, software, firmware, or combination thereof. However, for ease of explanation, in the embodiments described below the method 200 may be considered to be implemented in the above-described system 102.

At block 302, an information request relating to a problem may be received.

At block 304, problem data comprising metadata associated to the problem, and decision-making data may be received.

At block 306, an information type for the information request may be determined based on the problem data using an acquisition model.

At block 308, a set of human agents from a list of one or more human agents may be determined for the information request based on the problem data using an engagement model.

At block 310, a request elicitation type may be determined for the set of human agents based on the problem data and the information type using an elicitation model.

At block 312, input for the information request may be received from the set of human agents based on the request elicitation type and the information type.

At block 314, the engagement model and the elicitation model may be retrained based on the input received from the set of human agents using recursive learning techniques.

At block 316, the decision-making data may be continuously enhanced based on the input received, the request elicitation type, and the information type.

Figure 4:
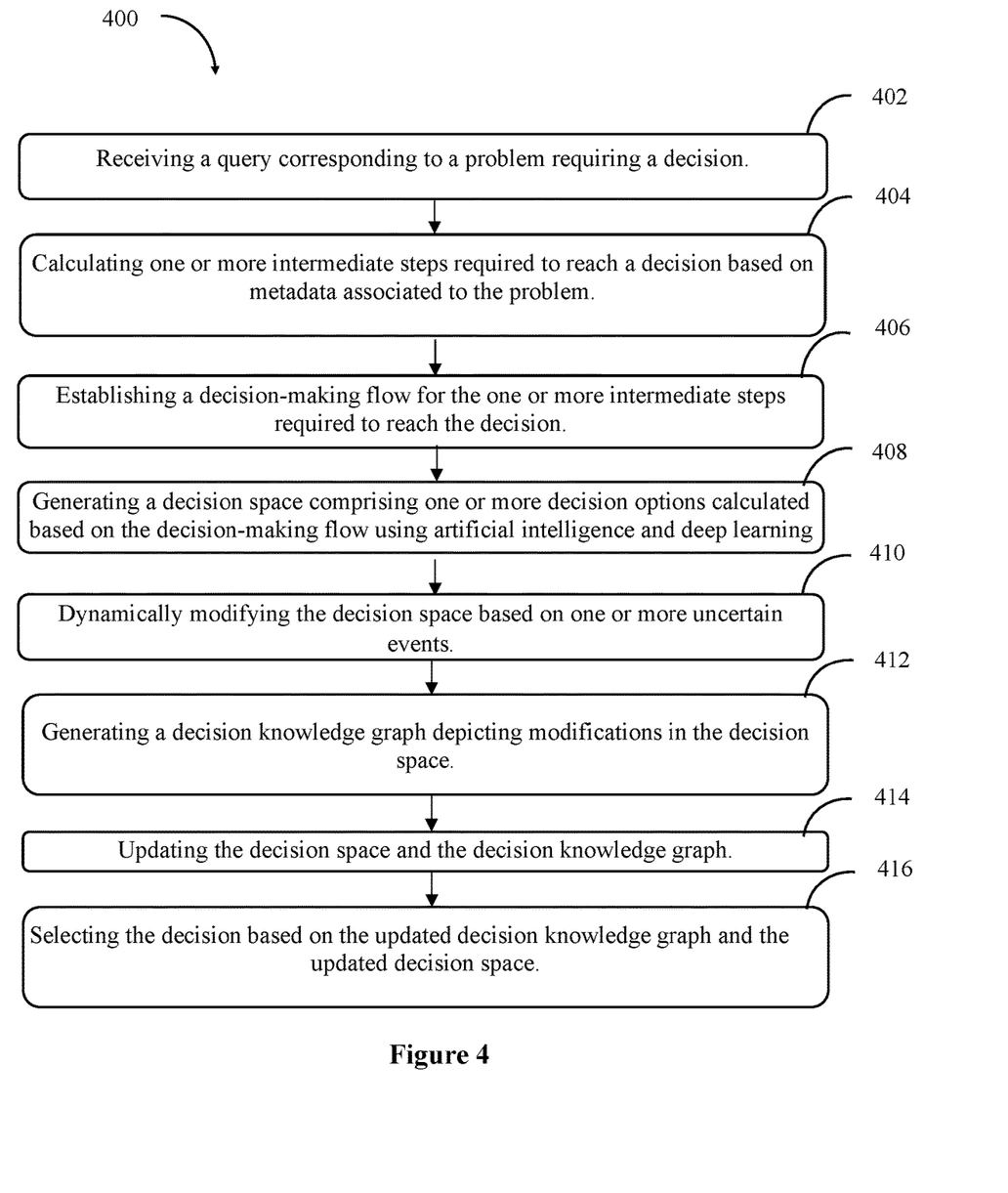
FIG. 4 illustrates a method for collaborative decision making in a dynamically changing environment, in accordance with an embodiment of the present subject matter.

Referring now to FIG. 4, a method 400 for collaborative decision making in dynamically changing environment is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 400 is described is not intended to be construed as a limitation, and any number of the described method blocks can be combined in any order to implement the method 400 or alternate methods for collaborative decision making in dynamically changing environment. Additionally, individual blocks may be deleted from the method 400 without departing from the scope of the subject matter described herein. Furthermore, the method 400 for collaborative decision making in dynamically changing environment can be implemented in any suitable hardware, software, firmware, or combination thereof. However, for ease of explanation, in the embodiments described below the method 400 may be considered to be implemented in the above-described system 302.

At block 402, a query corresponding to a problem for which a decision is required may be received from a user.

At block 404, one or more intermediate steps required to reach a decision may be calculated based on metadata. The one or more intermediate steps may be calculated using reinforcement learning, deep learning, and artificial intelligence algorithms. The metadata may be associated to the problem.

At block 406, a decision-making flow for the one or more intermediate steps required to reach the decision may be established. The decision-making flow may correspond to an order in which the one or more intermediate steps must be taken. The order may be determined based on an importance and a severity of the one or more intermediate steps using reinforcement learning and artificial intelligence techniques.

At block 408, a decision space comprising one or more decision options may be generated. The decision space may be calculated based on the decision-making flow using artificial intelligence and deep learning.

At block 410, the decision space may be modified based on one or more uncertain events. The one or more uncertain events may create an uncertain impact on the decision-making flow. The one or more uncertain events may be determined based on new information.

At block 412, a decision knowledge graph depicting modifications in the decision space may be generated.

At block 414, the decision space and the decision knowledge graph may be updated. The decision space may be updated post validation of the decision knowledge graph by the one or more human agents.

At block 416, the decision may be selected based on the updated decision knowledge graph and the updated decision space. The final decision may be selected post approval of the one or more human agents.

Figure 5:
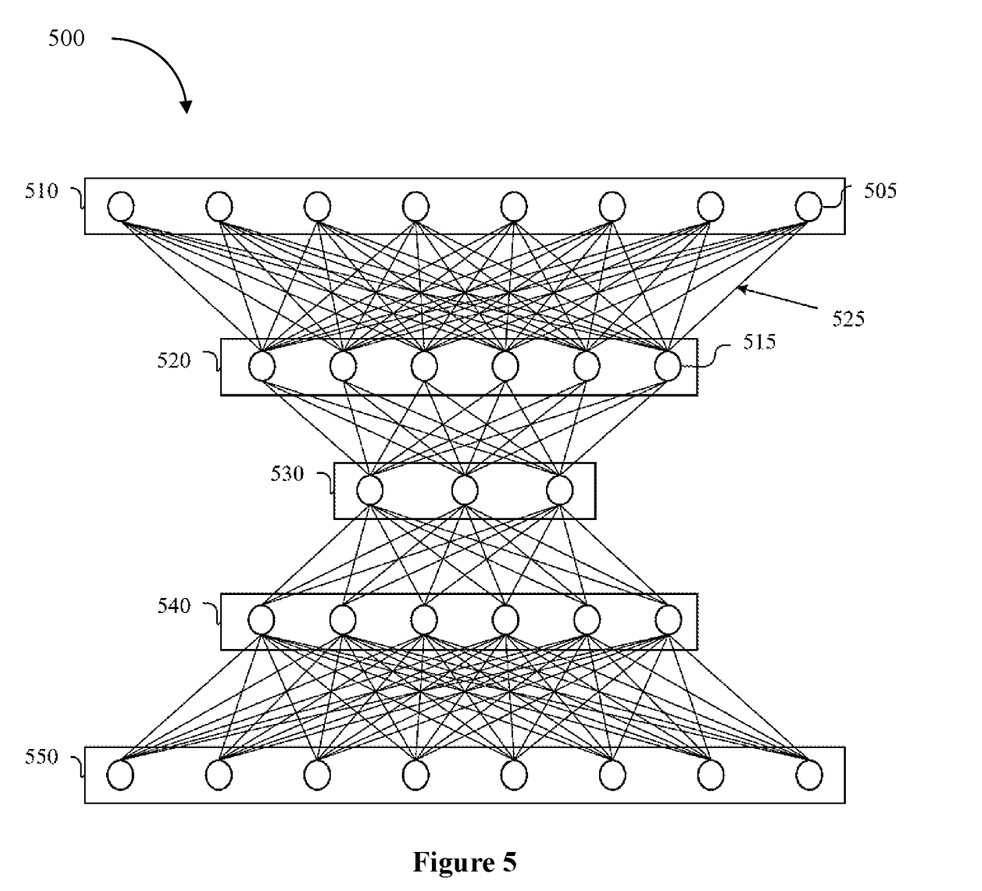
FIG. 5 illustrates an example artificial neural network that may be used to train a machine learning algorithm, in accordance with an embodiment of the present subject matter.

FIG. 5 illustrates an example artificial neural network ("ANN") 500 of the deep learning algorithms used to train the engagement model, and the elicitation model. In particular embodiments, an ANN may refer to a computational model comprising one or more nodes. Example ANN 500 may comprise an input layer 510, hidden layers 520, 530, 560, and an output layer 550. Each layer of the ANN 500 may comprise one or more nodes, such as a node 505 or a node 515. In particular embodiments, each node of an ANN may be connected to another node of the ANN. As an example, and not by way of limitation, each node of the input layer 510 may be connected to one of more nodes of the hidden layer 520. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 5 depicts a particular ANN with a particular number of layers, a particular number of nodes, and particular connections between nodes, this disclosure contemplates any suitable ANN with any suitable number of layers, any suitable number of nodes, and any suitable connections between nodes. As an example, and not by way of limitation, although FIG. 5 depicts a connection between each node of the input layer 510 and each node of the hidden layer 520, one or more nodes of the input layer 510 may not be connected to one or more nodes of the hidden layer 520.

In particular embodiments, an ANN may be a feedforward ANN (e.g., an ANN with no cycles or loops where communication between nodes flows in one direction beginning with the input layer and proceeding to successive layers). As an example, and not by way of limitation, the input to each node of the hidden layer 520 may comprise the output of one or more nodes of the input layer 510. As another example and not by way of limitation, the input to each node of the output layer 550 may comprise the output of one or more nodes of the hidden layer 560. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example, and not by way of limitation, the input into residual block N may be $F(x)+x$, where $F(x)$ may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example, and not by way of limitation, an activation function may be an identity function, a binary step function, a logistic function, or any other suitable function.

In particular embodiments, the input of an activation function corresponding to a node may be weighted. Each node may generate output using a corresponding activation function based on weighted inputs. In particular embodiments, each connection between nodes may be associated with a weight. As an example, and not by way of limitation, a connection 525 between the node 505 and the node 515 may have a weighting coefficient of 0.4, which may indicate that 0.4 multiplied by the output of the node 505 is used as an input to the node 515. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, the ANN may be trained using training data. As an example, and not by way of limitation, training data may comprise inputs to the ANN 500 and an expected output. As another example and not by way of limitation, training data may comprise vectors each representing a training object and an expected label for each training object. In particular embodiments, training the ANN may comprise modifying the weights associated with the connections between nodes of the ANN by optimizing an objective function. As an example, and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, the ANN may be trained using a dropout technique. As an example, and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training the ANN in a particular manner, this disclosure contemplates training the ANN in any suitable manner.

Exemplary embodiments discussed above may provide certain advantages. Though not required to practice aspects of the disclosure, these advantages may include those provided by the following features.

In some embodiments, the system may improve efficiency and speed of the decision-making.

In some embodiments, the system provides better decisions due to the involvement of human agents in the decision-making process.

In some embodiments, the system may help in reduction of manpower by automating managerial tasks, making decisions on behalf of the humans.

In some embodiments, the system may help in streamlining conversations between the one or more human agents involved in the decision-making process.

In some embodiments, the system alerts a user for an uncertain event impacting the decision.

In some embodiments, the system may augment the decision when there is an uncertain event creating an uncertain impact on the decision.

In some embodiments, the system may help to reduce the impact of the one or more uncertain events.

In some embodiments, the engagement engine may improve efficiency and speed of the decision-making.

In some embodiments, the system provides better decisions due to better involvement of one or more human agents in the decision-making process, wherein the one or more human agents provide information to the engagement engine to take part in the decision making process.

In some embodiments, the engagement engine may help in reduction of manpower by selecting appropriate number of human agents involved in the decision-making process.

In some embodiments, the engagement engine may help in streamlining conversations between the one or more human agents involved in the decision-making process and the collaborative decision-making system.

Although implementations for methods and the systems for engagement of human agents for decision-making in a dynamically changing environment have been described in a language specific to structural features and/or methods, it is to be understood that the appended claims are not necessarily limited to the specific features or methods described. Rather, the specific features and methods are disclosed as examples of implementations for engagement of human agents for decision-making in a dynamically changing environment.

What is claimed is:

1. A system for engagement of human agents for decision-making in a dynamically changing environment, the system comprises:
    a memory; and
    a processor coupled to the memory, wherein the processor is configured to execute instructions stored in the memory for:
        receiving an information request relating to a problem requiring a decision;
        receiving problem data comprising metadata associated to the problem, and decision-making data;
        generating training data comprising a plurality of information requests, problem data corresponding to the plurality of information requests, and corresponding information types for each of the plurality of information requests;
        training an acquisition model based on the generated training data using at least one of a Natural Language Processing (NLP) algorithm, and a Natural Language Understanding (NLU) algorithm;
        determining an information type, based on the problem data, using the acquisition model, wherein the information type is at least one of a fact, an opinion, and a judgement;
        identifying at least one human agent from a list of one or more human agents for the information request based on the problem data, wherein the at least one human agent is identified using an engagement model;
        determining a Request Elicitation Type (RET) for the at least one human agent based on the problem data and the information type using an elicitation model;
        receiving an input from the at least one human agent for the information request, based on the information type, and the RET; and
        continuously enhancing the decision-making data based on the received input, the determined request elicitation type, and the determined information type.

2. The system in claim 1, wherein the information request is received from a collaborative decision-making system, and wherein the collaborative decision-making system is used by a user to obtain a decision corresponding to the problem.

3. The system in claim 1, wherein the processor is further configured to execute instructions stored in the memory for:
    training the engagement model to calculate an information value, a participation value, and a human involvement cost for each human agent from the list of one or more human agents associated with the information request, wherein the information value corresponds to a merit of the input provided by a human agent via the user device; and
    retraining the engagement model based on the received input, wherein the received input is at least one of a text response, a visual response, an audio response, a video response, and a feedback.

4. The system in claim 3, wherein the feedback is regarding the information type determined by the acquisition model, and wherein the feedback is either negative or positive, and wherein the acquisition model is trained based on the feedback.

5. The system in claim 1, wherein the metadata comprises a goal, constraints, success measures, the list of the one or more human agents, historic data comprising input received from the at least one human agent, and a success ratio of the input received from the at least one human agent, and wherein the list of the one or more human agents defines responsibilities and seniority of each of the one or more human agents.

6. The system in claim 1, wherein the decision-making data comprises one or more intermediate steps, importance of the one or more intermediate steps, a decision-making flow, and historic data comprising past information requests received.

7. The system in claim 1, wherein identifying the at least one human agent further comprises calculating a participation value, an information value, and a human involvement cost for the at least one human agent, using the engagement model, based on the metadata.

8. The system in claim 1, wherein the Request Elicitation Type (RET) corresponds to framing of the information request for the at least one human agent, and wherein the determined RET is used to receive the input from the at least one human agent.

9. The system in claim 1, wherein determining the Request Elicitation Type (RET) further comprises generating a human agent profile, accessing one or more RET profiles, and matching the human agent profile with the one or more RET profiles using the elicitation model.

10. The system in claim 6, wherein the at least one human agent is identified from a set of human agents, wherein at least an intermediate step of the one or more intermediate steps has a corresponding information request, and wherein the set of human agents comprises one or more subsets of human agents for the one or more intermediate steps.

11. The system in claim 5, wherein the goal represents an objective or final expectation of the user, the constraints represent limitations of resources available to achieve the goal, and the success measures represent parameters utilized for confirmation of achievement of the goal.

12. The system in claim 1, wherein the engagement model is a machine learning model continuously trained using inputs provided by the at least one human agent.

13. The system in claim 1, wherein the elicitation model is a machine learning model continuously trained using inputs provided by the at least one human agent.

14. A method for engagement of human agents for decision-making in a dynamically changing environment, the method comprising:
    receiving, by a processor, an information request relating to a problem requiring a decision;
    receiving, by the processor, problem data comprising metadata associated to the problem, and decision-making data;
    generating, by the processor, training data comprising a plurality of information requests, problem data corresponding to the plurality of information requests, and corresponding information types for each of the plurality of information requests;
    training, by the processor, an acquisition model based on the generated training data using at least one of a Natural Language Processing (NLP) algorithm, and a Natural Language Understanding (NLU) algorithm;
    determining, by the processor, an information type, based on the problem data, using the acquisition model, wherein the information type is at least one of a fact, an opinion, and a judgement;
    identifying, by the processor, at least one human agent from a list of one or more human agents for the information request based on the problem data, wherein the at least one human agent is identified using an engagement model;
    determining, by the processor, a Request Elicitation Type (RET) for the at least one human agent based on the problem data and the information type using an elicitation model;
    receiving, by the processor, an input from the at least one human agent for the information request based on the information type, and the RET; and
    continuously enhancing, by the processor, the decision-making data based on the received input, the determined request elicitation type, and the determined information type.

15. The method in claim 14, wherein the information request is received from a collaborative decision-making system, and wherein the collaborative decision-making system is used by a user to obtain a decision corresponding to the problem.

16. The method in claim 14, further comprising:
    training, by the processor, the engagement model to calculate an information value, a participation value, and a human involvement cost for each human agent from the list of one or more human agents associated with the information request, wherein the information value corresponds to a merit of the input provided by a human agent via the user device; and
    retraining, by the processor, the engagement model based on the received input, wherein the received input is at least one of a text response, a visual response, an audio response, a video response, and a feedback.

17. The method in claim 16, wherein the feedback is regarding the information type determined by the acquisition model, and wherein the feedback is either negative or positive, and wherein the acquisition model is trained based on the feedback.

18. The method in claim 14, wherein the metadata comprises a goal, constraints, success measures, the list of the one or more human agents, historic data comprising input received from the at least one human agent, and a success ratio of the input received from the at least one human agent, and wherein the list of the one or more human agents defines responsibilities and seniority of each of the one or more human agents.

19. The method in claim 14, wherein the decision-making data comprises one or more intermediate steps, importance of the one or more intermediate steps, a decision-making flow, and historic data comprising past information requests received.

20. The method in claim 14, wherein identifying the at least one human agent further comprises calculating a participation value, an information value, and a human involvement cost, using the engagement model, based on the metadata.

21. The method in claim 14, wherein the Request Elicitation Type (RET) corresponds to framing of the information request for the at least one human agent, and wherein the determined RET is used to receive the input from the at least one human agent.

22. The method in claim 14, wherein determining the RET further comprises generating a human agent profile, accessing one or more RET profiles, and matching the human agent profile with the one or more RET profiles using the elicitation model.

23. The method in claim 19, wherein the at least one human agent is identified from a set of human agents, wherein at least an intermediate step of the one or more intermediate steps has a corresponding information request, and wherein the set of human agents comprises one or more subsets of human agents for the one or more intermediate steps.

24. The method in claim 18, wherein the goal represents an objective or final expectation of the user, the constraints represent limitations of resources available to achieve the goal, and the success measures represent parameters utilized for confirmation of achievement of the goal.

25. The method in claim 14, wherein the engagement model is a machine learning model continuously trained using inputs provided by the at least one human agent.

26. The method in claim 14, wherein the elicitation model is a machine learning model continuously trained using inputs provided by the at least one human agent.

27. A non-transitory computer program product having embodied thereon a computer program for engagement of human agents for decision-making in a dynamically changing environment, the computer program product storing instructions for:
- receiving an information request relating to a problem requiring a decision;
- receiving problem data comprising metadata associated to the problem, and decision-making data;
- generating training data comprising a plurality of information requests, problem data corresponding to the plurality of information requests, and corresponding information types for each of the plurality of information requests;
- training an acquisition model based on the generated training data using at least one of a Natural Language Processing (NLP) algorithm, and a Natural Language Understanding (NLU) algorithm;
- determining an information type, based on the problem data, using the acquisition model, wherein the information type is at least one of a fact, an opinion, and a judgement;
- identifying at least one human agent from a list of one or more human agents for the information request based on the problem data, wherein the at least one human agent is determined by using an engagement model;
- determining a Request Elicitation Type (RET) for the at least one human agent based on the problem data and the information type using an elicitation model;
- receiving an input from the set of human agents for the information request based on the information type, and the RET; and
- continuously enhancing the decision-making data based on the received input, the determined request elicitation type, and the determined information type.

* * * * *